United States Patent Office 3,385,844
Patented May 28, 1968

3,385,844
PROCESS FOR ISOLATION OF SOLANUM
ALKALOIDS FROM SOLANUM PLANTS
Luis E. Miramonte, Tlalnepantala, and Humberto J.
Flores, Mexico City, Mexico, assignors to G. D. Searle
& Co., Chicago, Ill., a corporation of Delaware
No Drawing. Filed Feb. 1, 1966, Ser. No. 523,878
5 Claims. (Cl. 260—210.5)

The present invention is concerned with a novel process for the isolation of valuable alkaloids from naturally occurring sources and, more particularly, with the isolation of alkaloids found in the Solanum plant family.

Three of the principal alkaloids found in Solanum plants are tomatine, solasonine, and solamargine. Typical species containing those alkaloids are *Solanum laciniatum, Solanum astroitees* Forst, *Solanum atriplicifolium, Solanum aviculare, Solanum auriculatum, Solanum gracile, Solanum heterophyllum, Solanum luteum, Solanum nigrum, Solanum sodomeum, Solanum tuberosum* and *Solanum verboscifolium.* These alkaloids are of special interest in view of their utilization as starting materials in the manufacture of valuable hormonal steroid derivatives. Removal of the carbohydrate portion of the alkali molecule by acid hydrolysis thus affords the corresponding aglycones, i.e. tomatidine from tomatine and solasidine from either solasonine or solamargine. Those aglycones are represented by the following structural formulas

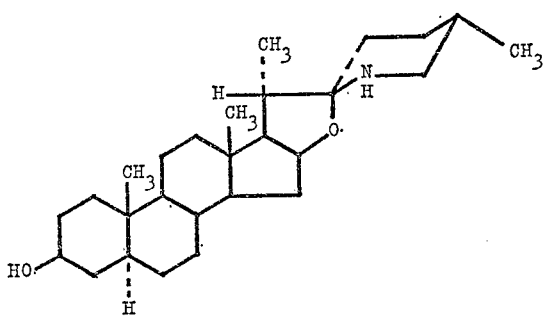

Tomatidine

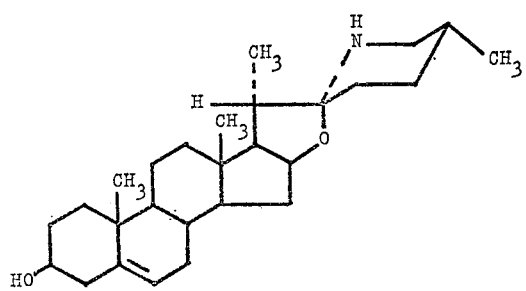

Solasodine

As described by Sato, Katz and Mosettig, J. Am. Chem. Soc. 74, 538 (1962), tomatidine upon heating with acetic anhydride followed by oxidation and hydrolysis affords 3β-hydroxy-5α-pregn-16-en-20-one. The conversion of the latter intermediate to progesterone has been described by Camerino, Alberti and Vercellone, Gazz., 83, 795 (1953) and by Tuzson, Bulcsu and Kertesz, Hungarian Patent 142,971. Solasodine, likewise, is converted to 3β-hydroxypregna-5,16-dien-20-one as described by Sato, Latham and Mosettig, J. Org. Chem., 22, 1496 (1957). Conversion of the latter substance to progesterone is reported by Butenandt and Schmidt-Thome, Ber. 71, 1487 (1938).

The isolation of Solanum alkaloids by extraction with acidic aqueous solutions has been described by various workers. Schreiber et al., Z. Naturforsch., 186, 471 (1963), thus discloses the extraction of tomatine from *Solanum demissum.* The use of aqueous solutions containing acetic acid, nitric acid or sulfuric acid for the isolation of solasonine is described, respectively, by Schreiber and Hammer, Tagunsber. Deut. Akad. Landwirschaftswiss. Berlin, 27, 47 (1961) Szasz., Acta Pharm. Hung., 31, 211–14 (1961) and Syhora, Czech Patent 96,718, Sept. 15, 1960. These prior art methods, however, suffer from the disadvantage that the extracted material is highly colored and difficult to handle due to the presence of contaminants which cannot easily be removed. In the process of the present invention there is utilized an acidic material which is also a reducing agent. In that manner, there is obtained a product of lighter color which is more easily purified apparently as a result of the elimination of colored contaminants, e.g. chlorophyll. Acidic reducing agents particularly suitable for this purpose are sulfur dioxide and hydrogen sulfide, used either individually or in combination. The plant material is preferably comminuted prior to slurrying with water. The acidic reagent is then added until a pH of 2–3 is obtained. The resulting slurry can be stored at 10–40° for about 24 hours or, preferably, can be stirred mechanically for a period of 2–6 hours at that temperature. When mechanical stirring is used, the optimum ratio of plant material to water is 1:2. Following that period of time, the aqueous extract is separated by filtration, then is made alkaline in order to precipitate the alkaloid together with unwanted contaminants. The use of lime as the alkali is particularly advantageous in that it serves as an adsorbent and filter aid in subsequent separation of the alkaloid. Purification of that crude material is effected by extraction, at the reflux temperature, with a lower alkanol such as ethanol. The purified alkaloid thus obtained, as was mentioned above, is converted by acid hydrolysis to the corresponding aglycone according to procedures known in the art.

The present process is specifically illustrated by the extraction of *Solanum laciniatum* leaves with an aqueous solution of sulfur dioxide at a pH of about 2 at room temperature for about 24 hours. The aqueous extract is separated by filtration, then made alkaline by the addition of lime. The precipitated material is collected by filtration and extracted with hot ethanol. Removal of the solvent affords the desired solasonine and solamargine, which can be converted to the corresponding aglycone, solasodine, by acid hydrolysis.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

Into a slurry of 2800 parts of comminuted fresh leaves of *Solanum laciniatum* with 3,000 parts of water is bubbled gaseous sulfur dioxide until a pH of 2 is reached. The resulting mixture is allowed to stand at room temperature for about 24 hours or, alternatively, is mechanically stirred for 2–6 hours. The solids are removed either by filtration or centrifugation, then are re-extracted with water containing sulfur dioxide as described above.

The solids are again removed either by filtration or centrifugation, and the combined extracts are made alkaline by the addition of 30 parts of lime. The precipitated crude alkaloid is isolated by filtration, then stirred and extracted four times with 240 parts of refluxing ethanol for a period of one hour each time, and the extracts are separated by hot filtration. Evaporation of the crude extracts to dryness affords a mixture of solasonine and solamargine. Hydrolysis of those glycosides by known methods results in solasodine.

EXAMPLE 2

The procedure of extraction and re-extraction with water containing sulfur dioxide at a pH of 2 described in Example 1 is repeated, using 1,000 parts of comminuted fresh green fruits of *Solanum laciniatum* and 1,000 parts of water. The combined extracts are made alkaline by the addition of 50 parts of lime, and the precipitated material is isolated by filtration, then stirred and extracted four times with 240 part portions of refluxing ethanol for a period of one hour each time. The extracts are isolated by hot filtration, then are combined and concentrated to dryness to yield a mixture of solasonine and solamargine, identical with the product of Example 1.

EXAMPLE 3

Into a slurry of 2800 parts of comminuted fresh fruits of *Solanum laciniatum* with 5600 parts of water is bubbled sulfur dioxide gas until a pH of 2–3 is reached. The resulting mixture is allowed to stand at room temperature for about 24 hours with occasional shaking. The solids are removed either by filtration or centrifugation, then re-extracted with aqueous sulfur dioxide solution at pH 2–3, as described above. The solids are again separated, and the combined extracts are made alkaline by the addition of 30 parts of lime. The mixture of crude alkaloids and lime, isolated by filtration, is extracted by stirring four times with 240 parts of refluxing ethanol for a period of one hour each time, and the extracts are separated by hot filtration. Evaporation of the combined crude extracts to dryness yields solasonine and solamargine.

EXAMPLE 4

A slurry of 2800 parts of comminuted fresh fruits of *Solanum laciniatum* and 5600 parts of water is stirred, and sulfur dioxide gas is bubbled into the mixture until a pH of 2–3 is reached. The resulting mixture is stirred at room temperature for 4 hours, after which time the solids are removed by centrifugation, then re-extracted with aqueous sulfur dioxide at pH 2–3, as described above. The solids are again separated, and the combined extracts are made alkaline by the addition of 30 parts of lime. The mixture of crude alkaloids and lime, isolated by filtration, is extracted by stirring four times with 240 parts of refluxing ethanol for a period of one hour each time, and the extracts are separated by hot filtration. Evaporation of the combined extracts to dryness gives a mixture of solasonine and solamargine.

EXAMPLE 5

A slurry of 2800 parts of comminuted fresh fruits of *Solanum demissum* and 5600 parts of water is stirred, and sulfur dioxide gas is bubbled into the mixture until a pH of 2–3 is reached. The extraction mixture is stirred at room temperature for about 4 hours, following which time the solids are removed by centrifugation, then re-extracted with aqueous sulfur dioxide at pH 2–3, as described above. The solids are again separated, and the combined extracts are made alkaline by the addition of 30 parts of lime. The mixture of crude alkaloids and lime, isolated by filtration, is extracted four times with 240 parts of refluxing ethanol for a period of one hour each time, and the extracts are separated by filtration of the hot suspension. Evaporation of the combined crude extracts to dryness gives a mixture of tomatine and demissine.

What is claimed is:

1. In a process for isolating Solanum alkaloids from Solanum plants, the step which comprises extracting the plant with an aqueous solution containing sulfur dioxide, the quantity of sulfur dioxide being such that the pH is 2–3.

2. As in claim 1, in a process for isolating solasonine and solamargine from Solanum plants, the step which comprises extracting the plant with an aqueous solution containing sulfur dioxide, the quantity of sulfur dioxide being such that the pH is 2–3.

3. As in claim 1, in a process for isolating solasonine and solamargine from *Solanum laciniatum* the step which comprises extracting the plant with an aqueous solution containing sulfur dioxide, the quantity of sulfur dioxide being such that the pH is 2–3.

4. As in claim 1, in a process for isolating solasonine and solamargine from *Solanum laciniatum* the step which comprises extracting the comminuted plant with an aqueous solution containing sulfur dioxide, the quantity of sulfur dioxide being such that the pH is 2–3.

5. As in claim 1, in a process for isolating tomatine and demissine from *Solanum demissum* the step which comprises extracting the plant with an aqueous solution containing sulfur dioxide, the quantity of sulfur dioxide being such that the pH is 2–3.

References Cited

UNITED STATES PATENTS

| | | | |
|---|---|---|---|
| 2,780,620 | 2/1957 | Krider et al. | 260—210.5 |
| 2,895,953 | 7/1959 | Wall et al. | 260—210.5 |
| 3,008,954 | 11/1961 | Renner et al. | 260—236 |

LEWIS GOTTS, *Primary Examiner.*

JOHNNIE R. BROWN, *Examiner.*